United States Patent
Kwon et al.

(10) Patent No.: US 7,835,716 B2
(45) Date of Patent: Nov. 16, 2010

(54) RF RECEIVING APPARATUS AND METHOD USING DC OFFSET FREE BASEBAND SIGNAL

(75) Inventors: Ick Jin Kwon, Yongin-si (KR); Heung Bae Lee, Suwon-si (KR); Yun Seong Eo, Suwon-si (KR); Hee Mun Bang, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1133 days.

(21) Appl. No.: 11/450,354

(22) Filed: Jun. 12, 2006

(65) Prior Publication Data

US 2007/0117528 A1     May 24, 2007

(30) Foreign Application Priority Data

Nov. 18, 2005   (KR)  ................. 10-2005-0110550

(51) Int. Cl.
  *H04B 1/26*   (2006.01)
(52) U.S. Cl. .............. 455/324; 455/295; 455/296; 455/323
(58) Field of Classification Search .......... 455/295, 455/296, 317, 323, 324, 337
See application file for complete search history.

(56) References Cited

U.S. PATENT DOCUMENTS

| | | | | |
|---|---|---|---|---|
| 5,574,978 A | * | 11/1996 | Talwar et al. | 455/63.1 |
| 6,061,551 A | * | 5/2000 | Sorrells et al. | 455/118 |
| 6,442,383 B1 | * | 8/2002 | Iemura | 455/312 |
| 2003/0007450 A1 | * | 1/2003 | Ohtaki | 370/208 |
| 2003/0054788 A1 | | 3/2003 | Sugar et al. | |
| 2005/0107051 A1 | * | 5/2005 | Aparin et al. | 455/126 |
| 2005/0207509 A1 | | 9/2005 | Saunders et al. | |

FOREIGN PATENT DOCUMENTS

| | | |
|---|---|---|
| DE | 10317600 A1 | 11/2004 |
| WO | 2006/037241 A1 | 4/2006 |

\* cited by examiner

*Primary Examiner*—Tuan H Nguyen
(74) *Attorney, Agent, or Firm*—Sughrue Mion, PLLC

(57) ABSTRACT

An RF receiver and an RF receiving method are provided using a baseband signal in which a DC offset is removed. In the RF receiver, a noise phase removing unit generates a phase controlled local signal PLOQ in which a phase of a Q signal of a local signal LOQ is controlled, by synthesizing a received RF signal RXIN and the Q signal of the local signal LOQ. A down converter generates a signal in which a DC offset from noise introduced into the received RF signal RXIN is removed, when synthesizing the received RF signal RXIN and the phase controlled local signal PLOQ for frequency-down conversion.

18 Claims, 4 Drawing Sheets

RF RECEIVING APPARATUS AND METHOD USING DC OFFSET FREE BASEBAND SIGNAL

CROSS-REFERENCE TO RELATED APPLICATION

This application claims priority from Korean Patent Application No. 10-2005-110550, filed on Nov. 18, 2005, in the Korean Intellectual Property Office, the entire disclosure of which is incorporated herein by reference.

BACKGROUND OF THE INVENTION

1. Field of the Invention

Apparatuses and methods consistent with the present invention relate to transmitting and receiving radio frequency (RF) signals, and more particularly to an RF receiver and an RF receiving method which processes a baseband signal in which a direct current (DC) offset is removed in a demodulator.

2. Description of Related Art

A transceiver that transmits and receives a radio frequency (RF) signal is utilized in a system for transmitting/receiving high speed wireless data, such as a mobile phone, a digital multimedia broadcasting (DMB) phone, and a personal digital assistant (PDA). A transmitter transmits data by including the data in a predetermined carrier signal. A receiver extracts data by processing a received RF signal. Presently, the development of a transceiver, which can be miniaturized with low power consumption even in a ubiquitous system of a multi-band orthogonal frequency division multiplexing ultra-wide band standard (MB-OFDM UWB), is an important issue in the design and implementation of various types of portable systems.

FIG. 1 is a diagram illustrating a conventional RF receiver 100. Referring to FIG. 1, the RF receiver 100 includes an in-phase mixer (I-mixer) 110, a quadrature-phase mixer (Q-mixer) 130, low pass filters (LPFs) 120 and 140, and a demodulator 150.

The I-mixer 110 multiplies and frequency-down converts a received RF signal RXIN and a local oscillator signal LOI. In this instance, a signal obtained by the multiplication is processed in the LPF 120 and an output of the LPF 120 is input into the demodulator 150. The Q-mixer 130 multiplies and frequency-down converts the RF signal RXIN and a Q signal, LOQ, of the local oscillation signal LOI. In this instance, the signal obtained by the multiplication is processed in the LPF 140 and an output of the LPF 140 is input into the demodulator 150. The demodulator 150 demodulates the outputs of the LPFs 120 and 140 according to algorithms, such as phase shift keying (PSK), quadrature phase shift keying (QPSK) and amplitude shift keying (ASK), and obtains certain information contained in the signal that is demodulated. The demodulated signal may be further processed in a post processor. Also, the demodulated signal is indicated as information that a user can recognize, via an audio output device or display, such as a mobile phone, a DMB phone, a PDA, and a radio frequency identification (RFID) reader.

As described above, circuits for separately processing an I-path and a Q-path in preparation for a noise component received with the RF signal RXIN are added in the conventional RF receiver 100. Accordingly, circuits become more complicated and power consumption increases. Also, a direct current (DC) offset may be present in an output of the mixers 110 and 130 due to the received noise component. Accordingly, a circuit for removing an effect of the DC offset has to be added in the demodulator 150. Also, the received noise component described above may be introduced from a directional coupler (DCPLR) which is utilized in a transceiver of a general full-duplex communication method. As an example, a transceiver of a system such as an RFID tag reader transmits/receives an RF signal via one antenna. In this case, a leakage of a transmitting RF signal may be introduced into a received RF signal from a DCPLR connecting transmitting and receiving paths.

BRIEF SUMMARY

The present invention provides an RF receiver which generates a baseband signal in which a DC offset is initially removed in a Q-path and subsequently inputs the baseband signal into a demodulator without using an I-path to remove the offset, and demodulates the generated baseband signal, thereby reducing a burden of the demodulator for removing the DC offset due to a received noise component.

The present invention also provides an RF receiving method which can generate and demodulate a baseband signal in which a DC offset is removed only in a Q-path.

According to an aspect of the present invention, there is provided an RF receiver including: a noise phase removing unit that generates a phase controlled local signal in which a phase of a local signal is controlled by a synthesis of a received signal and the local signal; and a down converter that synthesizes and frequency-down converts the received signal and the phase controlled local signal, wherein frequency down conversion of the received signal and the phase controlled local signal is controlled to remove a DC offset, which results from a noise signal that is introduced into the received signal, by controlling a phase of the phase controlled local signal.

In the RF receiver, the DC offset may be removed according to a phase of the local signal or a Q signal of the local signal. Also, the RF receiver may perform demodulation by using only the frequency-down converted signal of the received signal the phase controlled local signal from the down converter, without using another local signal having a 90 degree phase difference with respect to the local signal, according to algorithms such as amplitude shift keying (ASK).

According to another aspect of the present invention, there is provided a transceiver comprising a directional coupler that couples transmission and reception of radio frequency (RF) signals to an antenna, and an RF receiver which receives RF signal from the directional coupler. The RF receiver may comprise a noise phase removing unit that generates a phase controlled local signal in which a phase of a local signal is controlled by a synthesis of a received signal and the local signal, and a down converter that synthesizes and frequency-down converts the received signal and the phase controlled local signal. Further, a noise signal of a transmitting signal is introduced into the received signal from the directional coupler and wherein frequency down conversion of the received signal and the phase controlled local signal is controlled to remove a DC offset, which results from the noise signal that is introduced into the received signal, by controlling a phase of the phase controlled local signal.

According to another aspect of the present invention, there is provided an RF receiving method including: generating a phase controlled local signal in which a phase of a local signal is controlled by using a synthesis of a received signal and the local signal; and synthesizing and frequency-down converting the received signal and the phase controlled local signal, wherein frequency down conversion of the received signal and the phase controlled local signal is controlled to remove a DC offset, which results from a noise signal that is introduced into the received signal, by controlling a phase of the phase controlled local signal.

BRIEF DESCRIPTION OF THE DRAWINGS

The above and other aspects of the present invention will become apparent and more readily appreciated from the following detailed description, taken in conjunction with the accompanying drawings of which.

DETAILED DESCRIPTION OF THE EXEMPLARY EMBODIMENTS OF THE INVENTION

Figure 1:
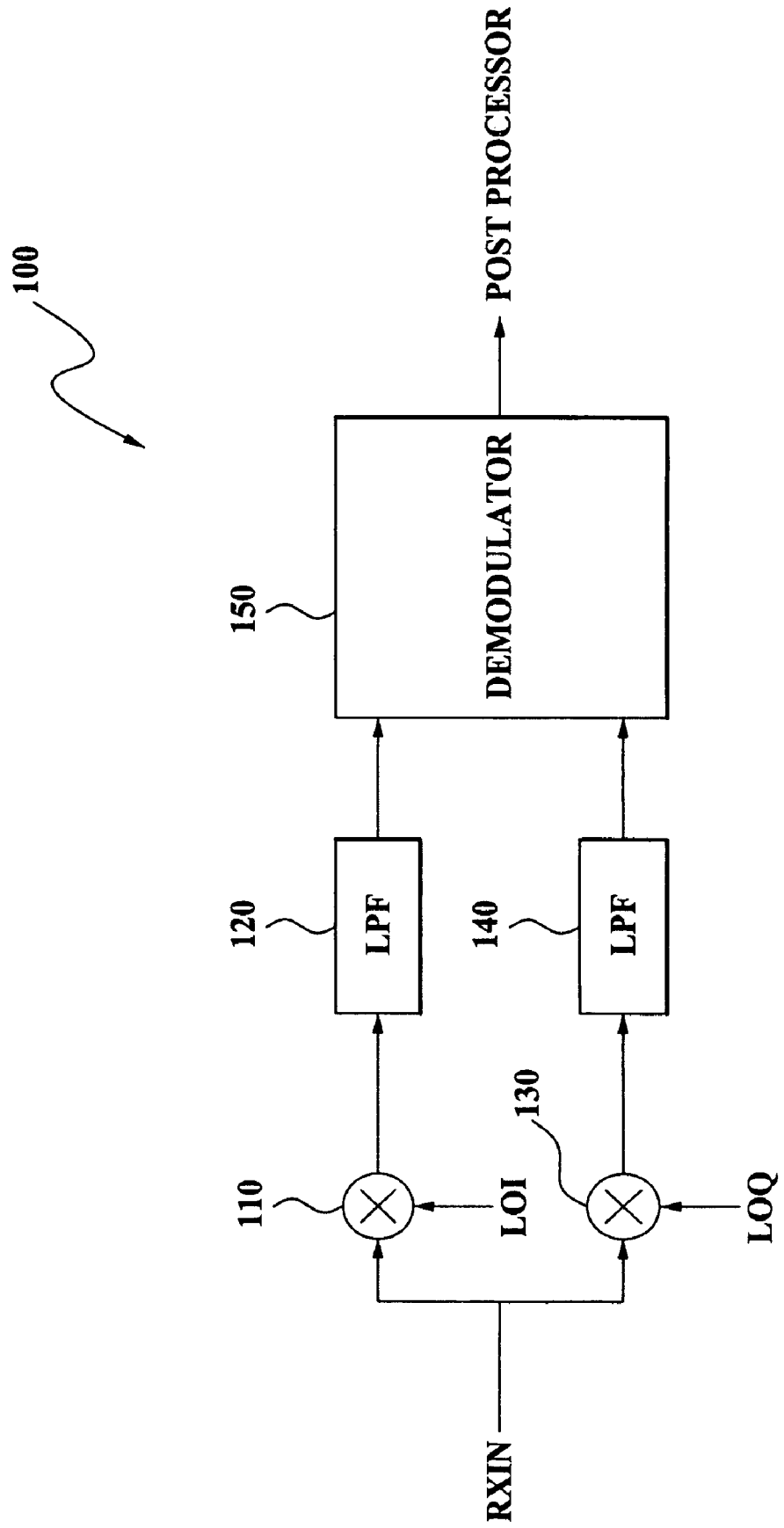
FIG. 1 is a diagram illustrating a conventional RF receiver.

Reference will now be made in detail to exemplary embodiments of the present invention, examples of which are illustrated in the accompanying drawings, wherein like reference numerals refer to the like elements throughout. The exemplary embodiments are described below in order to explain the present invention by referring to the figures.

Figure 2:
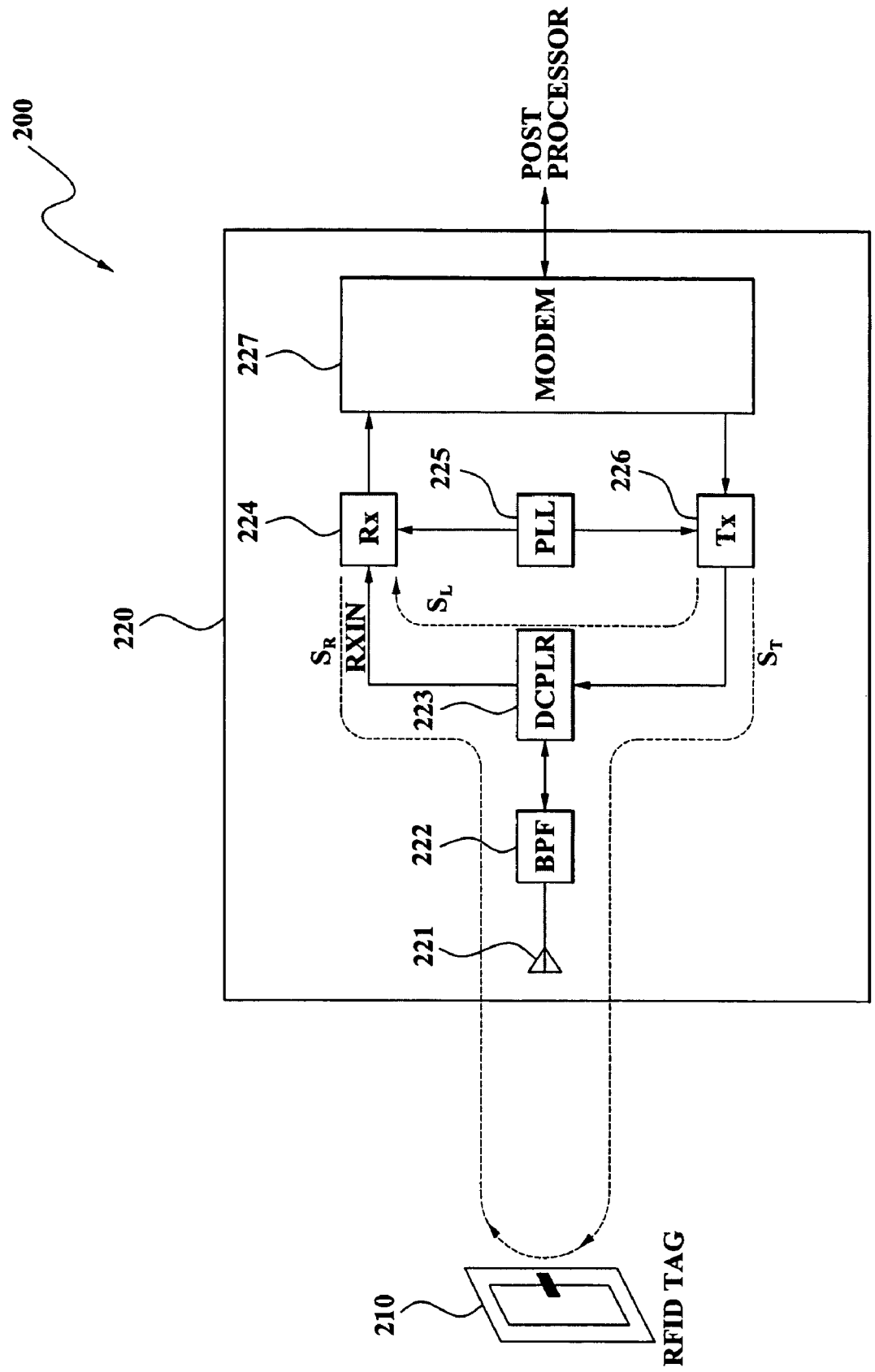
FIG. 2 is a diagram for explaining an RFID transmitting/receiving system.

FIG. 2 is a diagram for explaining a radio frequency identification (RFID) transmitting/receiving system 200. Referring to FIG. 2, the RF transmitting/receiving system 200 includes an RFID tag 210 and a reader 220. The RFID tag 210 includes identification information in an RF signal from the reader. The RFID tag 210 may be attached to things, such as goods, freights, materials and securities such as stocks, certificates, etc, and also to animals and plants. The RFID tag 210 stores identification information associated with a corresponding article in an integrated circuit (IC) chip. The reader 220 reads and manages the identification information associated with the corresponding article, which is stored in the IC chip, by a non-contact method. Through this, the reader 220 makes efficient management possible with respect to productions, distributions, and sales. As described above, an RFID tag reader has been taken as an example for an RF transceiver, but the principles described herein are applicable to all systems that transmit or receive RF signals.

A signal is processed in a modulation/demodulation unit (MODEM) 227. The reader 220 transmits the processed signal to the RFID tag 210 via a transmitting unit Tx 226, a directional coupler (DCPLR) 223, a band pass filter (BPF) 222 and an antenna 221. An RF signal which is reflected while carrying information read from the RFID tag 210 is received in a receiving unit Rx 224 via the antenna 221, the BPF 222 and the DCPLR 223. A signal that is converted to a baseband frequency in the receiving unit 224 may be demodulated in the MODEM 227. Also, the demodulated signal may be processed and managed in a post processor. A phase locked loop (PLL) 225 is utilized for locking a phase of a carrier wave signal and a local oscillation signal. In this instance, the carrier wave signal is utilized to transmit the information contained in the demodulated signal in the MODEM 227 in the form of an RF signal and the local oscillation signal is used in the frequency down conversion of a received RF signal. The carrier wave signal and the local oscillation signal for transmitting/receiving may have the same frequency $f_0$ in the reader 220.

To easily remove a noise signal component introduced into a received RF signal, a general RF receiver utilizes both a local oscillation signal LOI and a Q signal, LOQ, of the local oscillation signal LOI, for frequency-down conversion. The noise may be externally introduced into the received RF signal RXIN by the environment. However, according to an aspect of the present invention, an output of the transmitting unit 226 removes a leakage component that is introduced via the DCPLR 223 when utilizing a transceiver of a full-duplex communication method, such as the reader 220. As shown in a graph 410 of FIG. 4, when spectrum ST of an output of the transmitting unit 226 has a certain size in carrier wave frequency $f_0$, leakage signal spectrum SL introduced via the DCPLR 223 may have a certain size as shown in a graph 420. In this instance, as shown in a graph 430, an SL component 432, besides an clean SR spectrum component 431 of a received RF signal within $\pm\Delta$, and are introduced into spectrum (SR+SL) of a signal that is received in the receiving unit 224.

The RF signal RXIN received in the receiving unit 224 may be represented as Equation 1. In Equation 1, ARF cos($\omega$RFt) corresponds to the SR component 431, and Aleak cos($\omega$LOt) corresponds to the SL component 432.

$$VRXIN(t)=ARF\cos(\omega RFt)+A\text{leak}\cos(\omega LOt) \quad \text{(Equation 1)}$$

When a received RF signal RXIN is processed in a frequency-down converting mixer to convert the received RF signal in the receiving unit 224 to a baseband, a direct current (DC) offset is generated by the SL component 432. In this case, a circuit of a post demodulator becomes complicated to remove the DC offset. Also, the DC offset deteriorates a signal to noise ratio (SNR). Accordingly, the DC offset needs to be removed.

As an example, with the assumption that a local oscillation signal LOI and a Q signal, LOQ, of the local oscillation signal LOI, as shown in Equation 2 below, are used in a mixer for frequency-down converting the received RF signal RXIN, a frequency-down converted signal may be represented as Equation 3. In Equation 2, $\theta$ is a phase difference between the SL component 432 and one of the local oscillation signal LOI or the Q signal, LOQ, of the local oscillation signal LOI $$VLOI(t)=ALO\cos(\omega LOt+\theta)$$

$$VLOQ(t)=ALO\sin(\omega LOt+\theta) \quad \text{(Equation 2)}$$

$$VIFI(t)=\{ARF\cos(\omega RFt)+A\text{leak}\cos(\omega LOt)\}ALO\cos(\omega LOt+\theta)$$

$$VIFQ(t)=\{ARF\cos(\omega RFt)+A\text{leak}\cos(\omega LOt)\}ALO\sin(\omega LOt+\theta) \quad \text{(Equation 3)}$$

Accordingly, when Equation 3 is utilized, it can be determined that a DC offset component, in addition to a frequency-down converted component, exists as shown in Equation 4 below.

DC component of $VIFI(t)=\frac{1}{2}A\text{leak}ALO\cos\theta$

DC component of $VIFQ(t)=\frac{1}{2}A\text{leak}ALO\sin\theta \quad \text{(Equation 4)}$ In an exemplary embodiment of the present invention, the DC component generated by the received noise component is removed when generating a baseband signal. The baseband signal in which the DC component is removed may reduce a burden for removing a DC offset in a demodulator. Also, as shown in Equation 4, the DC component is removed according to a phase of a local oscillation signal LOI or a phase of a Q signal, LOQ, of the local oscillation signal LOI.

Hereinafter, a method of controlling the phase θ of the Q signal, LOQ, of the local oscillation signal LOI, to be zero and removing a DC component of VIFQ(t) according to an exemplary embodiment of the present invention will be described. However, the same objective may also be achieved by controlling the phase θ of the local oscillation signal LOI at 90 degrees.

Figure 3:
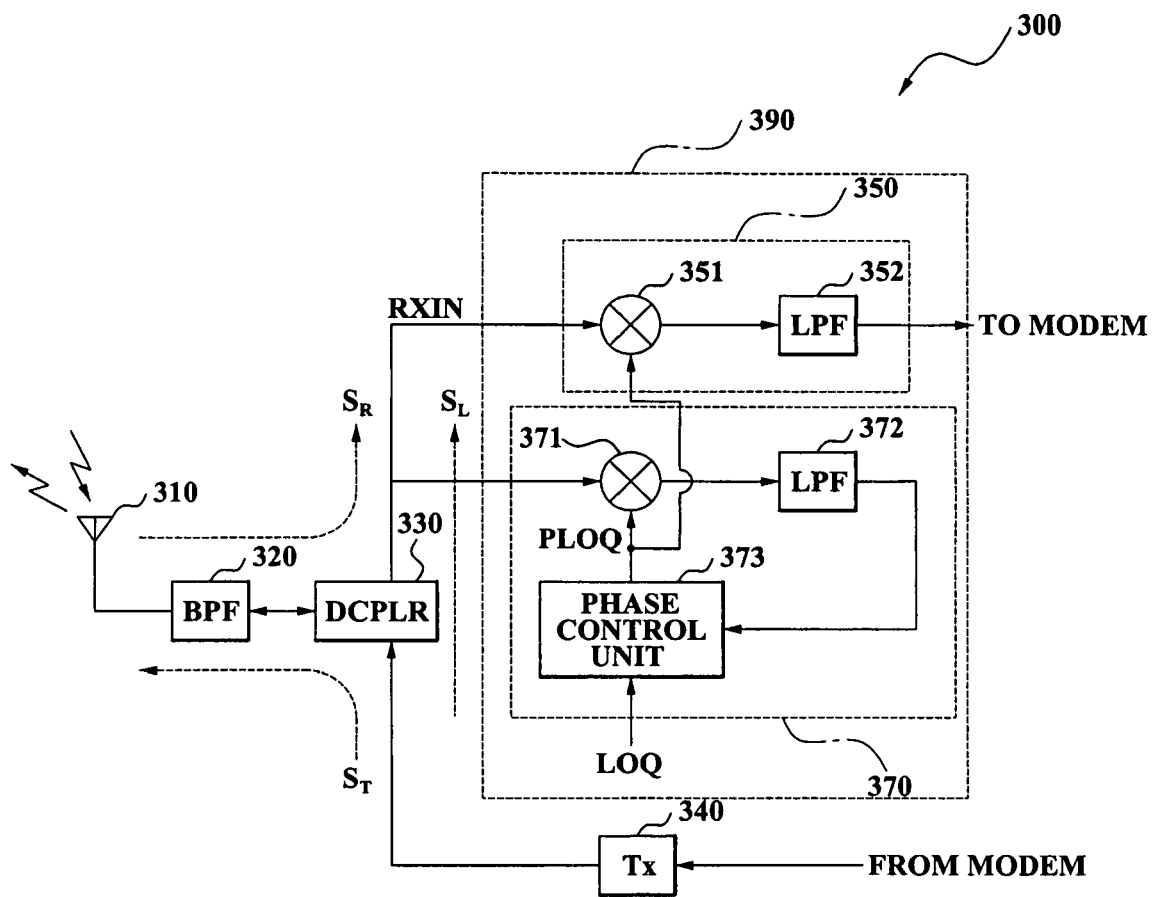
FIG. 3 is a diagram an RF transceiver according to an exemplary embodiment of the present invention.

An RF transceiver 300 according to an exemplary embodiment of the present invention is illustrated in FIG. 3. Referring to FIG. 3, the RF transceiver 300 includes an antenna 310, a BPF 320, a DCPLR 330 and a transmitting unit 340, which are similar to FIG. 2. Also, the RF transceiver 300 may include a receiving unit 390. The receiving unit 390 includes a down converter 350 and a noise phase removing unit 370.

The noise phase removing unit 370 may include a mixer 371, a low pass filter (LPF) 372, and a phase control unit 373.

The mixer 371 synthesizes a received RF signal RXIN into which an SR component and an SL component are introduced, as shown in Equation 1, and a phase controlled local oscillation signal PLOQ which is generated from the phase control unit 373. The SL component, as described above, is a leakage signal component into which a portion of an ST component is introduced via the DCPLR 330. The synthesis purpose of the mixer 371 is to generate and output a signal that is obtained by multiplying the received RF signal RXIN and the phase controlled local oscillation signal PLOQ, as the multiplication in VIFQ(t) of Equation 3.

The LPF 372 is connected to the mixer 371 and low pass filters an output of the mixer 371. The phase control unit 373 controls a phase of a local oscillation signal LOQ according to the output of the LPF 372, and generates the phase controlled local oscillation signal PLOQ and outputs signal PLOQ to the mixer 371 and the down converter 350.

In this instance, the local oscillation signal LOQ may correspond to any one of a local oscillation signal or a Q signal of the local oscillation signal which are generated in a certain PLL of the transceiver 300. For example, the local oscillation signal LOQ may be the Q signal of the local oscillation signal.

The LPF 372 may output a certain DC value according to the output of the mixer 371. Also, the phase control unit 373 may increase or decrease the phase of the local oscillation signal LOQ according to a DC value outputted from the LPF 372. As described above, the phase control unit 373 controls the phase of the local oscillation signal LOQ to be zero, such that the DC component of VIFQ(t) in Equation 4 may become zero, and outputs the phase controlled local signal PLOQ.

In this instance, each of the received RF signal RXIN and the phase controlled local oscillation signal PLOQ may be a set of differential signals. Also, the mixer 371 may output a set of synthesized differential signals. As is already known, a set of differential signals is a set of two signals having a 180 degree phase difference from each other and generally utilized to improve the SNR of a signal.

As described above, the noise phase removing unit 370 generates the signal PLOQ, in which the phase of the local oscillation signal LOQ is controlled, by using the synthesis of the received RF signal RXIN and the local signal LOQ via the mixer 371.

In FIG. 3, the down converter 350 includes a mixer 351 and an LPF 352.

The mixer 351 synthesizes the received RF signal RXIN and the phase controlled local oscillation signal PLOQ in the same manner as the mixer 371 and performs frequency-down conversion. In the frequency-down conversion, a DC offset due to a noise signal introduced into the received RF signal RXIN is controlled to be removed according to the phase of the phase controlled local oscillation signal PLOQ, for example, a zero phase.

Frequency-down conversion of the received RF signal RXIN according to synthesis of the mixer 351 may be performed by multiplying two signals, as shown in VIFQ(t) of Equation 3. As an example, when the received RF signal RXIN is 3000 MHz and the local signal is 1000 MHz, a signal of 2000 MHz may be generated by multiplying the two signals. In this case, a generated signal in a higher frequency than 3000 MHz may be filtered as noise. Also, if the phase of the phase controlled local oscillation signal PLOQ generated from the noise phase removing unit 370 is zero, the DC component of VIFQ(t) in Equation 4 also becomes zero.

Figure 4:
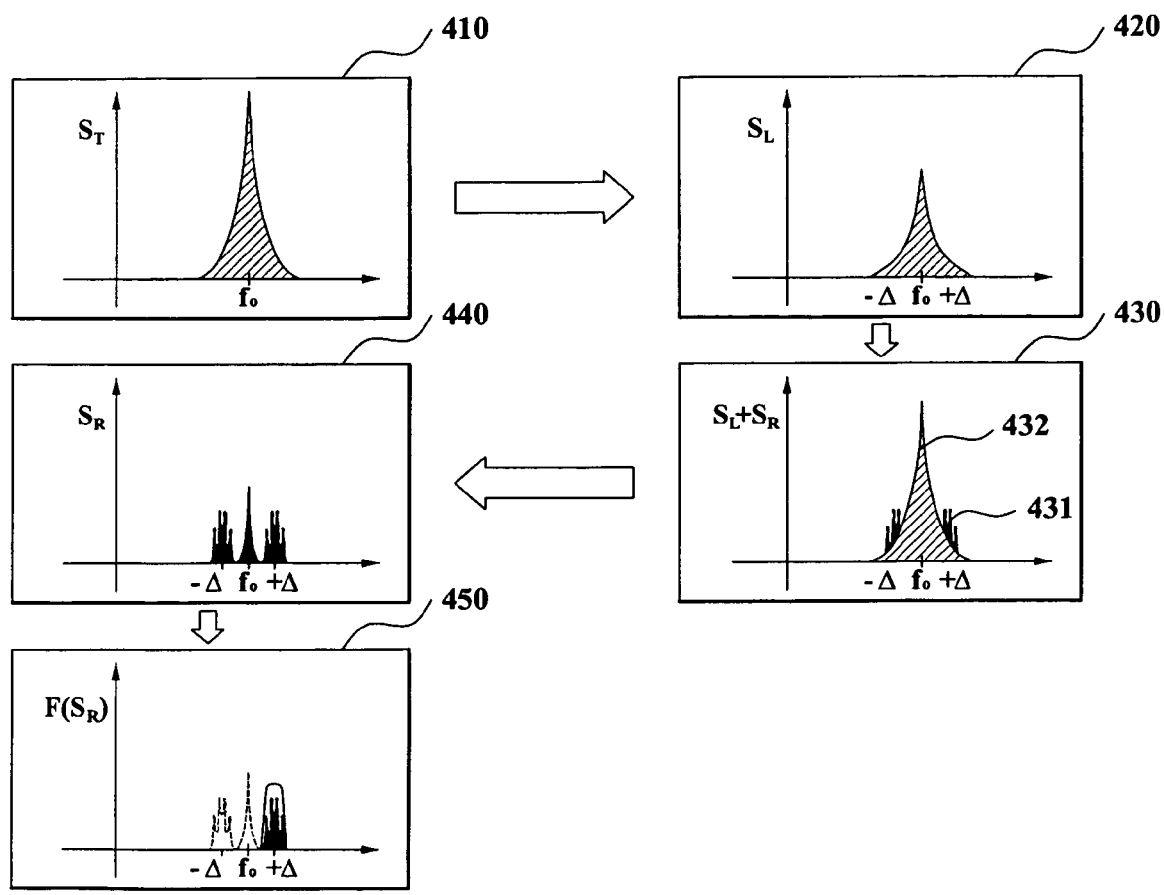
FIG. 4 is a diagram illustrating frequency spectrums for explaining a process of processing a signal transmitted/received by the RF transceiver of FIG. 3.

When the DC component shown by the SL component is removed as described above, an output of the mixer 351 may show only clean identification information by showing only an SR component 440. This is shown in FIG. 4. When only clean identification information is read, within ±Δ, from the RFID tag 210 of FIG. 2 and output from the mixer 351, the outputted clean identification information is low pass filtered in the LPF 352. The filtered output information of the LPF 352, as shown in a graph 450 of FIG. 4, may be demodulated in a MODEM.

As described above, a local oscillation signal LOI having a 90 degree phase difference with respect to the local oscillation signal LOQ is not utilized, in order to generate a baseband signal in the receiving unit 390 according to an exemplary embodiment of the present invention. In this instance, the local oscillation signal LOI may be utilized for another objective. The received RF signal RXIN is processed in only a Q-path, via the down converter 350 of the receiving unit 390. Only a frequency-down converted signal in which a DC component is removed in the mixer 351 is processed in the LPF 352. An output of the LPF 352 is demodulated in a MODEM. If the frequency-down converted signal in which the DC component is removed in the mixer 351 is a signal within an intermediate frequency band, the frequency-down converted signal may be converted once more to baseband by another mixer and processed in the LPF 352.

As described above, in an RF receiver according to an exemplary embodiment of the present invention, the noise phase removing unit 370 generates a signal PLOQ in which a phase of a Q signal of a local high frequency signal LOQ is controlled, by synthesizing a received RF signal RXIN and the Q signal of the local high frequency signal LOQ. The down converter 350, when synthesizing the received RF signal RXIN and the phase controlled signal PLOQ for frequency-down conversion, generates a signal in which a DC offset caused by noise introduced into the received RF signal RXIN is removed.

The RF receiver and RF receiving method according to the present invention, as described above, removes a DC offset caused by a noise component in a Q-path, when down converting a frequency of a received RF signal. Accordingly, a demodulation may be performed by only a baseband signal which is generated in the Q-path while not using an I-path. Thus, a demodulator does not need to remove a DC offset. Also, a circuit for an I-path process is not needed. Accordingly, a circuit area is reduced and complexity is also decreased. Also, power consumption is reduced. Accordingly, the RF receiver and RF receiving method according to exemplary embodiments of the present invention may be utilized in a transceiver of a ubiquitous system such as a mobile phone, a DBM phone, and a PDA, for transmitting/receiving high speed wireless data and also may increase system performance.

Exemplary embodiments of the present invention can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, and optical data storage devices.

Although a few exemplary embodiments of the present invention have been shown and described, the present invention is not limited to the exemplary embodiments described herein. Instead, it would be appreciated by those skilled in the art that changes may be made to these embodiments without departing from the principles and spirit of the invention, the scope of which is defined by the claims and their equivalents.

What is claimed is:

1. A radio frequency (RF) receiver comprising:
a noise phase removing unit that generates a phase controlled local signal in which a phase of a local signal is controlled by a synthesis of a received signal and the local signal; and
a down converter that synthesizes and frequency-down converts the received signal and the phase controlled local signal,
wherein frequency down conversion of the received signal and the phase controlled local signal is controlled to remove a DC offset, which results from a noise signal that is introduced into the received signal, by controlling a phase of the phase controlled local signal, and the noise phase removing unit comprises:
a mixer that synthesizes the received signal and the phase controlled local signal;
a low pass filter connected to an output of the mixer; and
a phase control unit that generates the phase controlled local signal by controlling the phase of the local signal according to an output of the low pass filter, said phase control unit outputting the phase controlled local signal that is generated to the mixer and the down converter.

2. The RF receiver of claim 1, wherein the DC offset is a Q signal of a local oscillation signal.

3. The RF receiver of claim 1, wherein a demodulation is performed by using only a frequency-down converted signal of the received signal and the phase controlled local signal from the down converter, without using another local signal having a 90 degree phase difference with respect to the local signal.

4. The RF receiver of claim 3, wherein the demodulation is an amplitude shift keying (ASK) demodulation.

5. The RF receiver of claim 1, wherein the phase control unit increases or decreases the phase of the local signal according to a DC value that is output from the low pass filter.

6. The RF receiver of claim 1, wherein the mixer generates and outputs a signal that is obtained by multiplying the received signal and the phase controlled local signal.

7. The RF receiver of claim 6, wherein each of the received signal and the phase controlled local signal is a first set of differential signals and the mixer outputs a second set of differential signals that are synthesized.

8. The RF receiver of claim 1, wherein the down converter comprises:
a mixer that synthesizes the received signal and the phase controlled local signal; and
a low pass filter that is connected to an output of the mixer.

9. A radio frequency (RF) receiving method comprising:
generating a phase controlled local signal in which a phase of a local signal is controlled by a synthesis of a received signal and the local signal; and
synthesizing and frequency-down converting the received signal and the phase controlled local signal,
wherein frequency down conversion of the received signal and the phase controlled local signal is controlled to remove a DC offset, which results from a noise signal that is introduced into the received signal, by controlling a phase of the phase controlled local signal, and the generating of the phase controlled local signal comprises:
synthesizing the received signal and the phase controlled local signal to provide a synthesized signal;
low pass filtering the synthesized signal; and
generating the phase controlled local signal by controlling the phase of the local signal according to the synthesized signal that is low pass filtered.

10. The method of claim 9, wherein the DC offset is a Q signal of a local oscillation signal.

11. The method of claim 9, further comprising demodulating the received signal, wherein a demodulation is performed by using only a frequency-down converted signal of the received signal and the phase controlled local signal from the down converter, without using another local signal having a 90 degree phase difference with respect to the local signal.

12. The method of claim 11, wherein the demodulation is an amplitude shift keying (ASK) demodulation.

13. The method of claim 9, wherein the noise signal is a noise component of a transmitting signal that is introduced into the received signal by a transceiver that utilizes a directional coupler used to transmit and receive RF signals.

14. The method of claim 9, wherein the phase of the local signal is controlled to be increased or decreased according to a DC value that is output by the low pass filtering.

15. The method of claim 9, wherein a signal obtained by multiplying the received signal and the phase controlled local signal is generated and output by the synthesizing of the received signal and the phase controlled local signal.

16. The method of claim 15, wherein each of the received signal and the phase controlled local signal is a first set of differential signals and a second set of differential signals is output by the synthesizing.

17. The method of claim 9, wherein the frequency-down converting comprises:
synthesizing the received signal and the phase controlled local signal to provide a synthesized signal; and
low pass filtering the synthesized signal.

18. A non-transitory computer readable recording medium storing a program for implementing a radio frequency (RF) receiving method comprising: generating a phase controlled local signal in which a phase of a local signal is controlled by a synthesis of a received signal and the local signal; and synthesizing and frequency-down converting the received signal and the phase controlled local signal, wherein frequency down conversion of the received signal and the phase controlled local signal is controlled to remove a DC offset, which results from a noise signal that is introduced into the received signal, by controlling a phase of the phase controlled local signal, and the generating of the phase controlled local signal comprises: synthesizing the received signal and the phase controlled local signal to provide a synthesized signal; low pass filtering the synthesized signal; and generating the phase controlled local signal by controlling the phase of the local signal according to the synthesized signal that is low pass filtered.

* * * * *